US012611684B2

(12) United States Patent
Sullenger

(10) Patent No.: US 12,611,684 B2
(45) Date of Patent: Apr. 28, 2026

(54) APPARATUS FOR STORING AND DISPENSING GRANULAR MATERIAL

(71) Applicant: Kenneth Sullenger, Providence, RI (US)

(72) Inventor: Kenneth Sullenger, Providence, RI (US)

(73) Assignee: Kenneth, North Providence, RI (US)

( * ) Notice: Subject to any disclaimer, the term of this patent is extended or adjusted under 35 U.S.C. 154(b) by 206 days.

(21) Appl. No.: 18/677,469

(22) Filed: May 29, 2024

(65) Prior Publication Data

US 2025/0367683 A1 Dec. 4, 2025

(51) Int. Cl.
*B05B 1/30* (2006.01)

(52) U.S. Cl.
CPC .................................... *B05B 1/30* (2013.01)

(58) Field of Classification Search
CPC .... B05B 1/30; A47J 42/34; A47J 42/46; A47J 42/24; A24B 7/04
USPC ........................................... 222/559, 196.2
See application file for complete search history.

(56) References Cited

U.S. PATENT DOCUMENTS 2,139,289 A * 12/1938 Skoda .................. A47G 19/24 222/522
8,083,167 B1 * 12/2011 Namakian ............ A47J 42/24 241/169.1
9,681,777 B1 * 6/2017 Dukat .................. B02C 18/18
9,757,733 B1 * 9/2017 Dukat .................. A47J 42/40
11,825,989 B1 * 11/2023 Moore .................. A47J 42/34
2005/0258189 A1 * 11/2005 Peterson ............. G01F 11/261 222/105
2006/0186138 A1 * 8/2006 Brundick ............. A47J 31/404 222/158
2006/0191958 A1 * 8/2006 Brundick ............. A47J 31/404 222/158
2007/0221771 A1 * 9/2007 Wang .................. A47J 42/06 241/169.1
2008/0191073 A1 * 8/2008 Bao ..................... B02C 18/24 241/101.2
2011/0147505 A1 * 6/2011 Griffin ................. A47J 43/04 241/68
2012/0097774 A1 * 4/2012 Hainbach ............. A47J 42/50 241/101.2
2012/0153060 A1 * 6/2012 Ng ...................... A47J 42/34 241/259

(Continued)

FOREIGN PATENT DOCUMENTS

WO WO-2021144003 A1 * 7/2021 ............ A47J 42/04
WO WO-2022182859 A1 * 9/2022 ............ B02C 18/08
WO WO-2023180602 A1 * 9/2023 ............ A47J 42/02

*Primary Examiner* — Paul R Durand
*Assistant Examiner* — Michael J. Melaragno

(57) ABSTRACT

An apparatus stores herbs, tobacco, tea or other granular material and dispenses the granular material in varying quantities depending on the dispensing mechanism used. The apparatus has a storage container and a mixing and dispensing mechanism with push-button actuation. The mixing-dispensing mechanism is a camshaft terminating in a plug which is held in a normally closed position against the aperture. Helical cams on the shaft rotate to open an aperture to dispense granular material. Depressing the button dispenses a first quantity of granular material; rotating the button and shaft dispenses a second quantity.

12 Claims, 9 Drawing Sheets

100

(56) References Cited

U.S. PATENT DOCUMENTS

| | | | | |
|---|---|---|---|---|
| 2012/0168544 | A1* | 7/2012 | Chaoui | A47J 42/24 241/68 |
| 2014/0217213 | A1* | 8/2014 | Edwards | A47J 42/38 241/91 |
| 2014/0261471 | A1* | 9/2014 | Ruzycky | A24C 5/42 131/108 |
| 2014/0319249 | A1* | 10/2014 | Smith | A47J 43/25 241/24.1 |
| 2014/0353412 | A1* | 12/2014 | Grumbacher | A24C 5/40 241/70 |
| 2015/0144719 | A1* | 5/2015 | Wilson | A47J 42/50 241/85 |
| 2015/0298135 | A1* | 10/2015 | Spielman | A47J 42/50 241/101.01 |
| 2016/0100715 | A1* | 4/2016 | Staiano | A47J 42/34 241/79 |
| 2017/0112324 | A1* | 4/2017 | Kaczmarek | A47J 42/06 |
| 2017/0202396 | A1* | 7/2017 | Gumbel | A47J 42/12 |
| 2017/0215469 | A1* | 8/2017 | Beck | A47J 42/32 |
| 2017/0245541 | A1* | 8/2017 | Pagan | A47J 42/12 |
| 2017/0319009 | A1* | 11/2017 | Seckel | A47J 42/12 |
| 2018/0271328 | A1* | 9/2018 | Petrossian | A47J 42/24 |
| 2019/0059439 | A1* | 2/2019 | Richmond | A24C 5/42 |
| 2019/0343333 | A1* | 11/2019 | Wiener | A47J 42/34 |
| 2020/0029738 | A1* | 1/2020 | Rizzotti | A47J 42/28 |
| 2020/0187717 | A1* | 6/2020 | Pagan | A47J 42/34 |
| 2020/0237156 | A1* | 7/2020 | Brouillac | A47J 42/08 |
| 2020/0268208 | A1* | 8/2020 | Abehasera | A47J 42/44 |
| 2020/0269254 | A1* | 8/2020 | Abehasera | A47J 42/16 |
| 2021/0038027 | A1* | 2/2021 | McCreedy | A47J 42/40 |
| 2021/0100278 | A1* | 4/2021 | Santofimio Bedoya | A24C 5/44 |
| 2021/0148744 | A1* | 5/2021 | Fredsall | B65D 83/06 |
| 2021/0282447 | A1* | 9/2021 | Abehasera | A47J 42/46 |
| 2022/0039599 | A1* | 2/2022 | Abehasera | A47J 42/28 |
| 2022/0218152 | A1* | 7/2022 | Joel | A47J 42/12 |
| 2022/0265090 | A1* | 8/2022 | Hall | A47J 42/42 |
| 2022/0378085 | A1* | 12/2022 | Hall | A47J 42/12 |
| 2023/0039557 | A1* | 2/2023 | Veelo | A24B 5/10 |
| 2023/0077839 | A1* | 3/2023 | Gleason | A47J 42/42 241/92 |
| 2023/0165406 | A1* | 6/2023 | Morales | B02C 19/20 241/169.1 |
| 2023/0345994 | A1* | 11/2023 | Bodenchuk | A24B 7/04 |
| 2025/0113949 | A1* | 4/2025 | Sawaged | A47J 42/34 |
| 2025/0134156 | A1* | 5/2025 | Bodenchuk | A47J 42/34 |
| 2025/0325143 | A1* | 10/2025 | Guoping | A47J 42/38 |
| 2025/0367683 | A1* | 12/2025 | Sullenger | B05B 1/30 |

* cited by examiner

200

APPARATUS FOR STORING AND DISPENSING GRANULAR MATERIAL

TECHNICAL FIELD

The present disclosure relates in general to handling and distributing granular material and specifically to storing and dispensing granular herb material in a measured predetermined measured amount, or in a continuous flow.

BACKGROUND

Herbs and tobacco are stored in containers of many variations. Some dispense their contents in a spot deposit for filling a pipe, or in a column deposit, to fill a cigarette. Few devices both store and dispense ground herbs or tobacco in various formations while preventing the granular material from sticking to the container during dispensing.

SUMMARY

In an example embodiment, a dispensing apparatus uses a cam-driven internal dispensing mechanism for storing and dispensing granular material.

An apparatus stores herbs, tobacco, tea or other granular material and dispenses the granular material in varying quantities depending on the dispensing mechanism used. The apparatus has a storage container, an internal dispensing mechanism and a dispensing aperture at its distal end. The dispensing mechanism may be operated by depressing a cylindrical button to dispense a measured quantity, or by rotating the cylindrical button to dispense a continuous stream of granular material.

The mixing-dispensing mechanism is a camshaft terminating in a plug which is held in a normally closed position against the aperture. Helical cams on the shaft rotate to open the aperture to dispense granular material. Depressing the button dispenses a first quantity of granular material. Manually rotating the button, which causes the shaft to turn, dispenses a second quantity. The second quantity is a continuous as long as the button continues to be rotated.

When the button is depressed, helical cams on the shaft rotate approximately 120°, momentarily moving the plug away from the aperture while simultaneously rotating a feed-screw mechanism, allowing a portion of granular material to dispense.

A main body has a distal cap and a proximal cap, each with exterior gripping ridges. The distal cap has an aperture for dispensing granular material. In some embodiments the proximal cap is replaced by a proximal collar. The proximal cap/collar holds the push-button against an interior spring, which when extended presses on the button to hold it in a normally up position. At the distal end the plug is held in a normally closed position, blocking the aperture and holding the granular material in a storage section of the main body until the button is depressed to dispense the material. One skilled in the art understands that to move the plug to a closed position involves moving the plug in the opposite direction from the direction to move the button to the upward position.

At the distal end of the camshaft, adjacent to the plug, radial fins turn to mix and move material for dispensing. Helical ribs help direct the granular material toward the aperture, and create friction to hold the granular material in place. When the plug is simultaneously retracted and turned (120 degrees per cycle) the fins shear the granular material and it falls down and out of the aperture. The fins, ribbed shaft and the helical ribs work together to mix and move material for dispensing.

As the camshaft moves, an internal ribbed camshaft-cover assists in mixing the granular material. The shaft has a head that is slidably joined to the button with splines and grooves that cause the head and button to rotate together. One skilled in the art understands that other mechanisms such as ribs and grooves or other textures may also join objects so that they rotate together. The head and button each have helical cam gears that engage with stationary teeth. When the button is depressed, the button, head, shaft and attached helical fins move axially while the shaft rotates. Depressing the button and helical cams on the shaft to rotate, momentarily retracting the plug from the aperture while simultaneously rotating a feed-screw mechanism, allowing a portion of granular material to dispense. Rotating the button multiple times repeats the process, permitting dispensing of a continuous flow of granular material. In some embodiments a top surface of the button rotates freely so that a user's thumb rests on the top surface while the button rotates along with the aforementioned rotating components.

DETAILED DESCRIPTION

Figure 1:
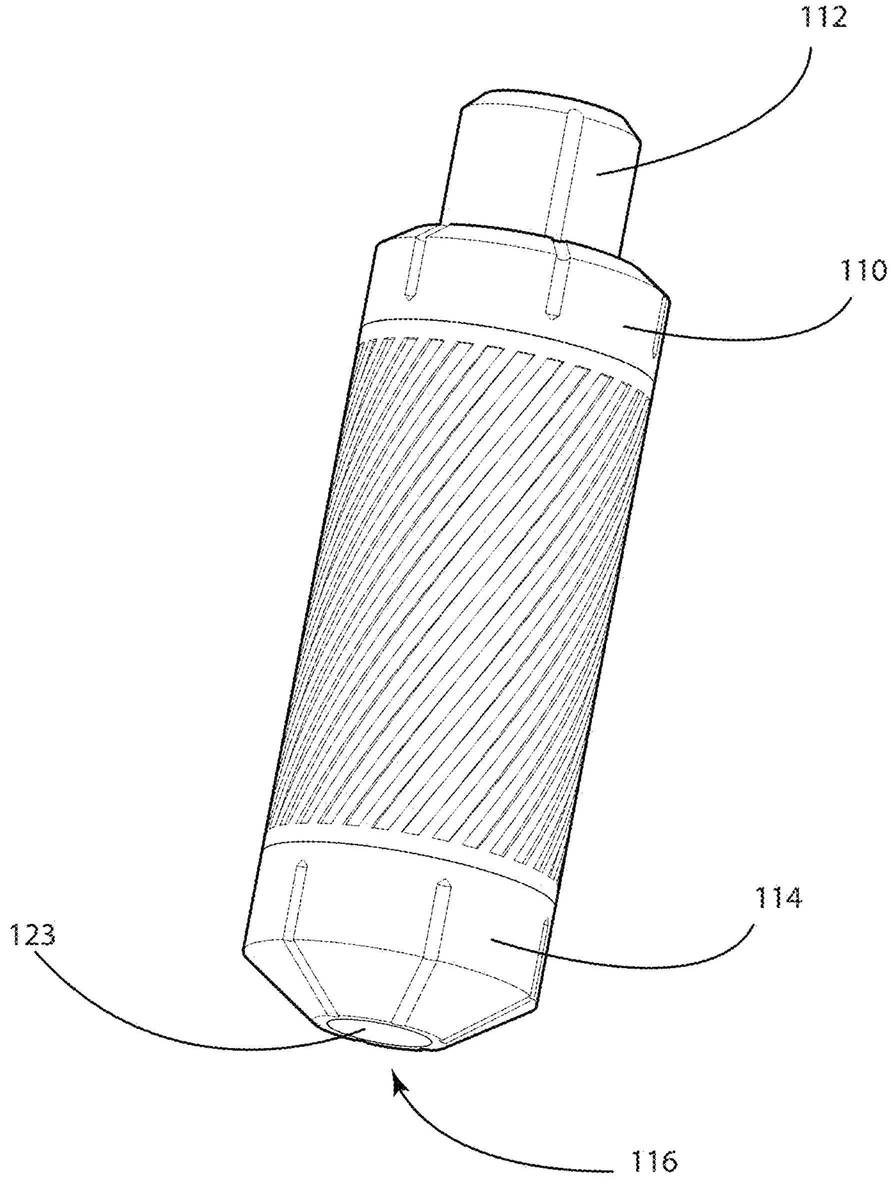
FIG. 1 is a perspective view of an apparatus for storing and dispensing granular material.
Figure 4:
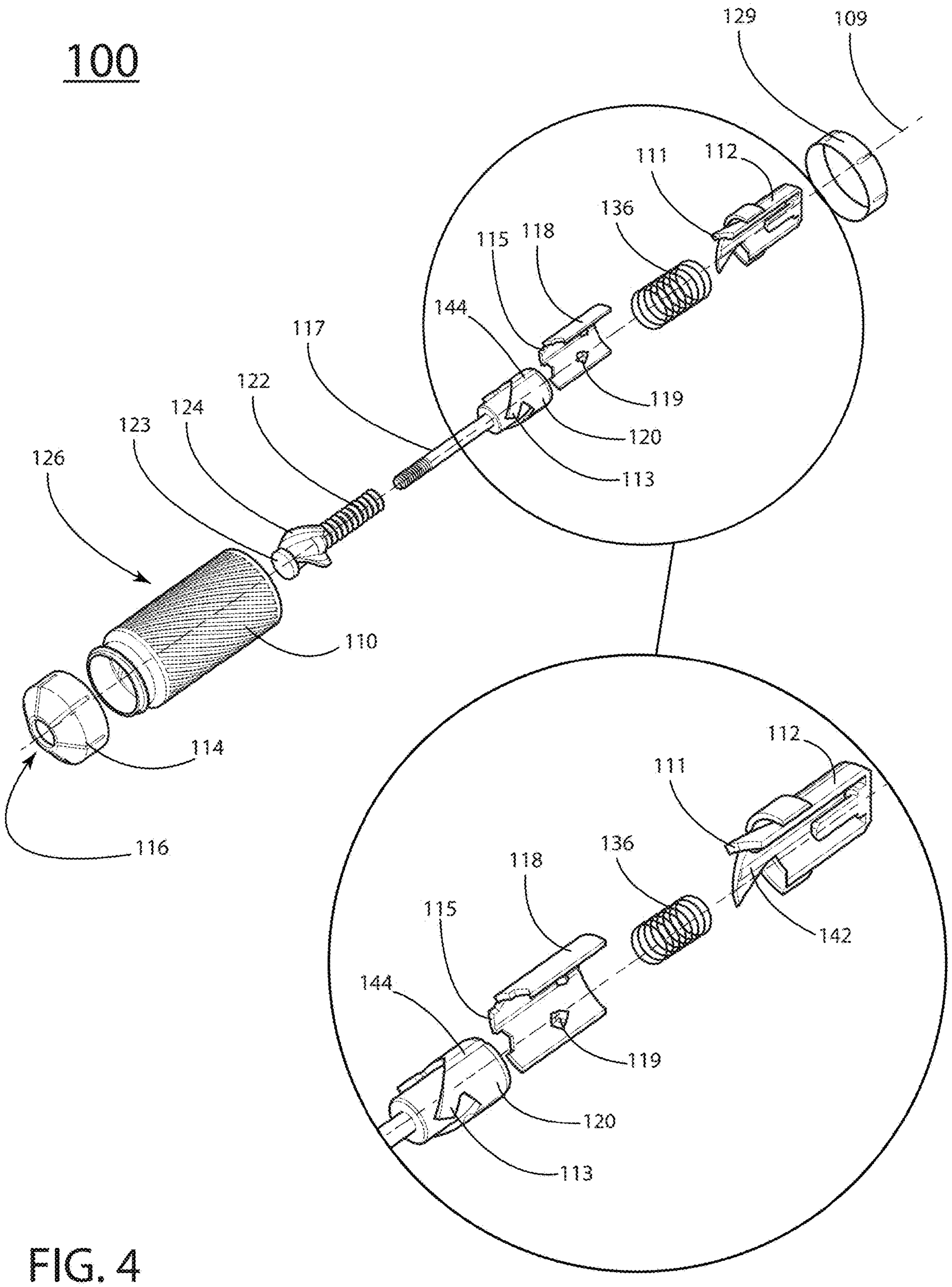
FIG. 4 is a perspective, exploded view of the example embodiment of FIG. 1.
Figure 5:
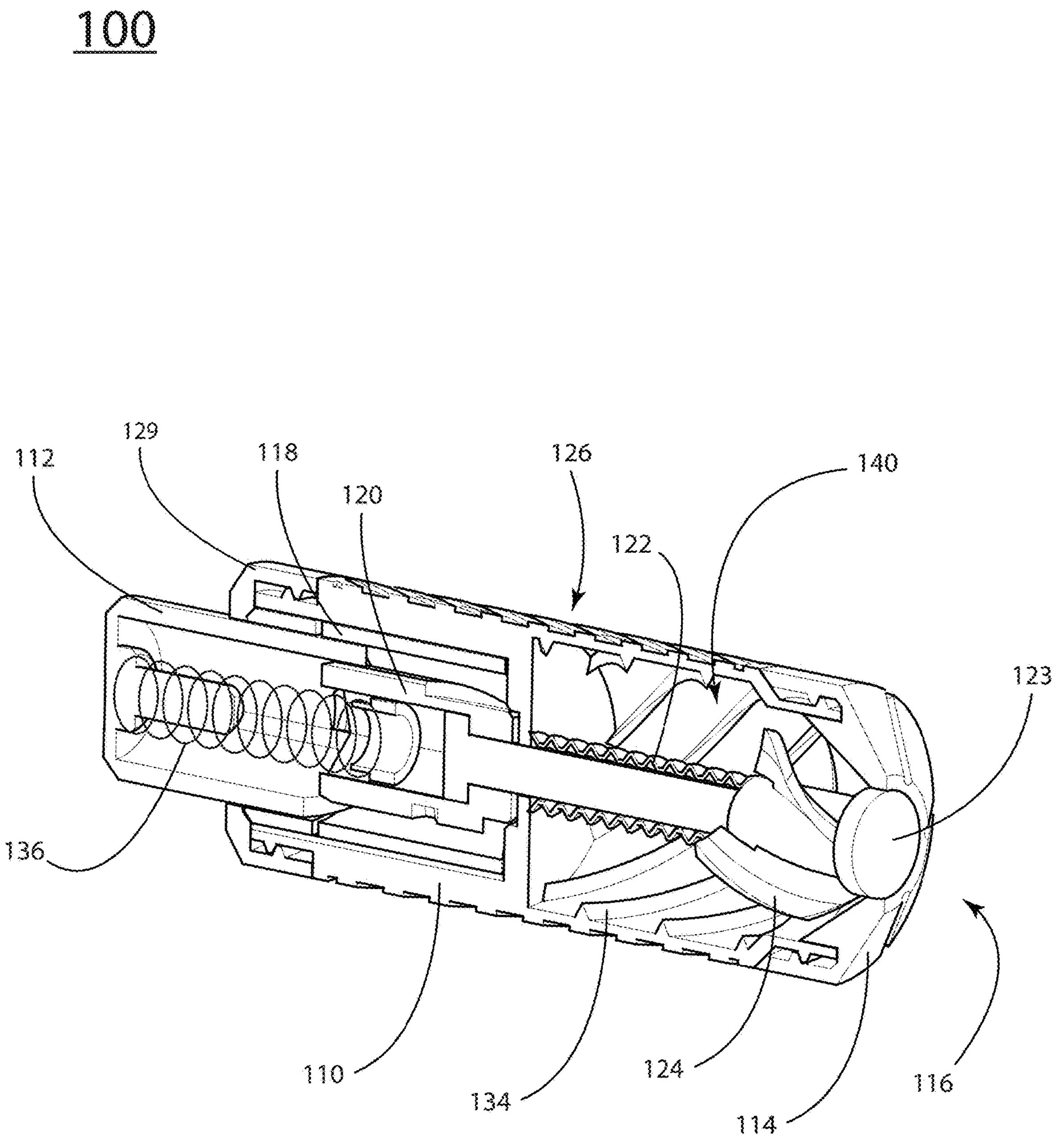
FIG. 5 is a perspective, section view thereof.

FIG. 1 shows an example embodiment which is an apparatus 100 that has a central container 110 that stores granular material. A cap 114 resides at a distal end of the apparatus and has an aperture 116 that is sealed by a plug 123 which is held in a normally closed position by a spring 136 (FIG. 4 and FIG. 5). A button 112 resides at a proximal end and may be rotated or depressed. When the button is depressed, the mechanism dispenses a predetermined quantity of granular material. When the button 112 is rotated, the mechanism dispenses a relatively larger quantity of granular material.

Figure 2:
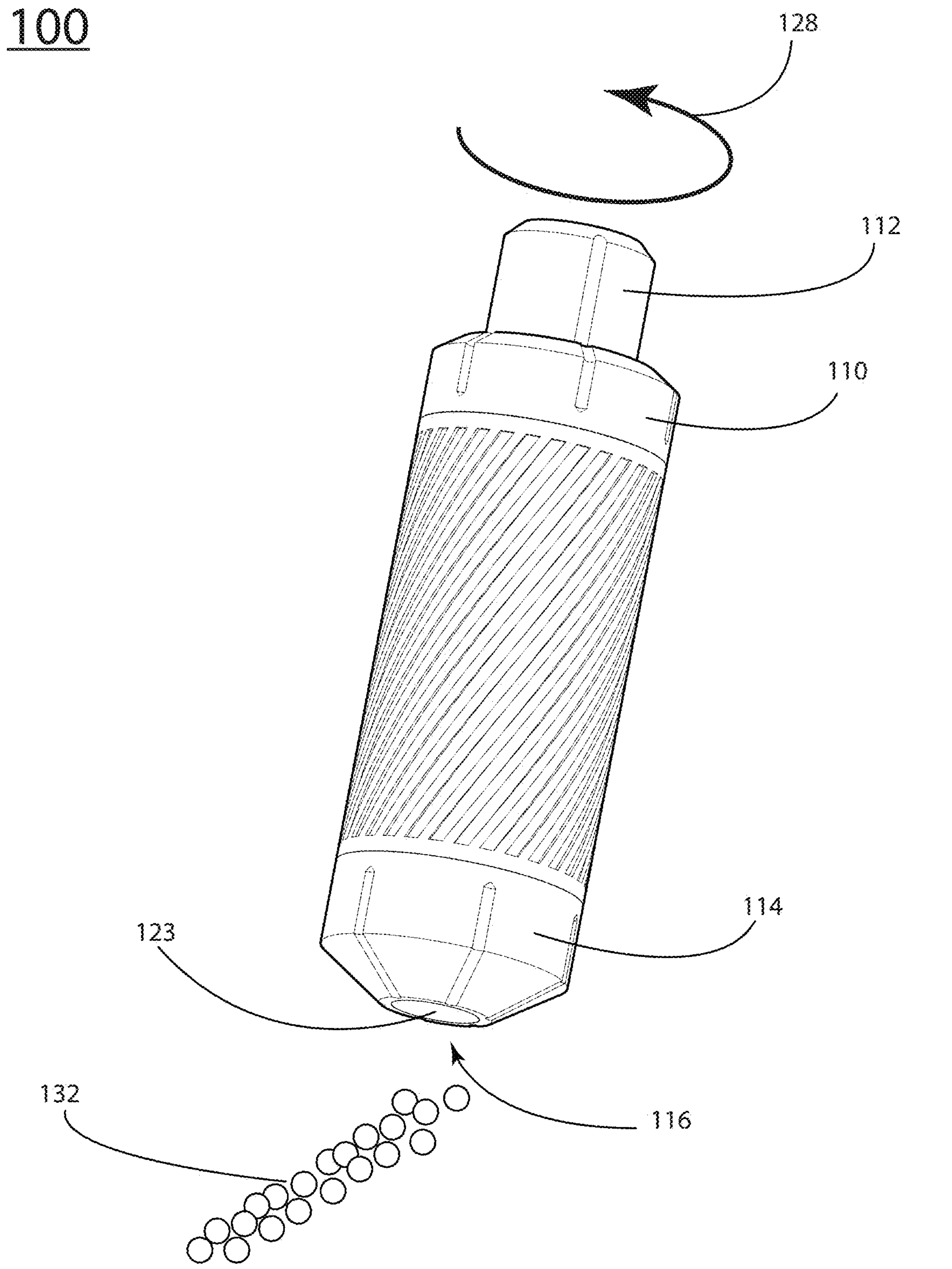
FIG. 2 is a perspective view thereof dispensing a quantity of granular material.

FIG. 2 shows the apparatus 100 dispensing a quantity of granular material when the button 112 has been rotated, demonstrated by arrow 128. The quantity of dispensed material 132 is dispensed in a continuous flow and may be, for example, dispensed in a line formation. The material continues to be dispensed as the button 112 continues to be rotated.

Figure 3:
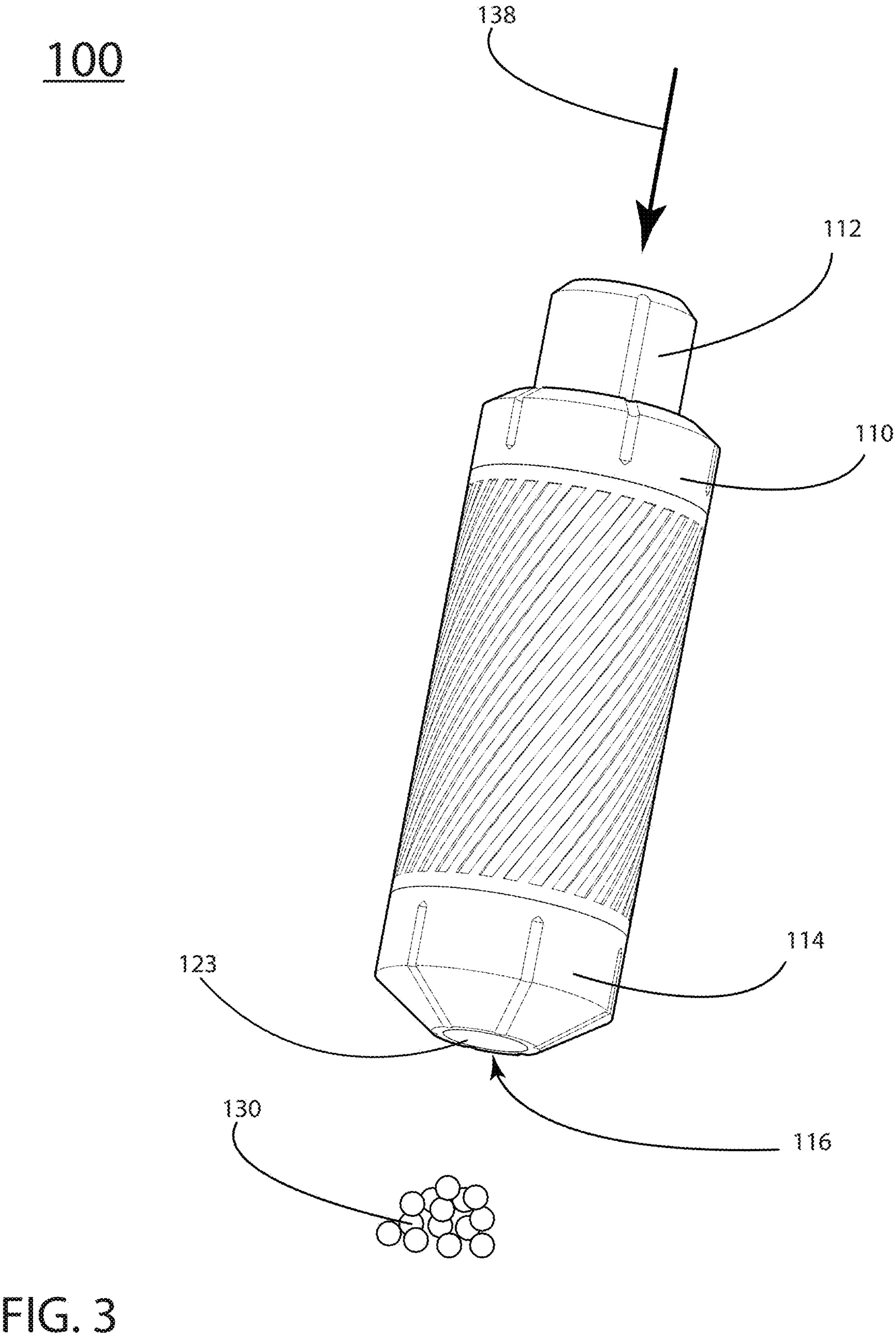
FIG. 3 is a perspective view of thereof dispensing a continuous flow of granular material.

In FIG. 3, a relatively smaller quantity of granular material has been dispensed by merely depressing the button (arrow 138). This smaller quantity dispenses the material in a predetermined amount of a relatively specific measurement, for example, a spot formation 130.

FIG. 4 and FIG. 5 show an exploded view (FIG. 4) along a central axis 109. The button 112 and a collar 118 are shown in section view to illustrate their interiors.

Ridges 126 provide a gripping surface on the exterior of the main body 110. The distal cap 114 has an aperture 116 through which granular material is dispensed. The proximal cap 129 holds the button 112 in place against the spring 136, keeping the button 112 in a normally up position and the plug 123 in a normally closed position, in which the aperture 116 is blocked. The granular material is stored in the container 140 until dispensed.

Mixing mechanisms keep the granular material from sticking to the apparatus's parts. In one of these mechanisms, at the distal end of shaft 117, a plug 123 has radial fins 124 that mix and move material for dispensing when rotated. The radial fins are disposed about a helical pattern. A ribbed cover 122 around the shaft serves to mix the granular material as the shaft rotates about the central axis 109. Granular material is further sheared by helical ribs 134 (FIG. 5) which direct the material in a helical motion toward the fins 124 and through the aperture 116 in the cap 114. In addition to directing the granular material toward the aperture, the helical ribs 134 add friction to hold the granular material in place. In some embodiments helical ribs 134 are disposed on the interior of the main body 110, about a helix that turns in the opposite direction of the helix with the radial fins 124. In other embodiments, helical ribs 134 are on a helix that turns in the same direction as the helix with the radial fins 124. When the plug 123 is simultaneously retracted and turned (at about 120° per cycle), the helical ribs 134, in combination with the radial fins 124, shear the granular material as it falls down and out of the apparatus. Fins 124, the ribbed shaft 122, and the helical ribs 134 work together to mix and move granular material for dispensing.

In some embodiments the aperture 116 is approximately 14 mm. The radius of the radial fins 124 is approximately 13.5 millimeters. The gap between the radial fins 124 and helical ribs 134 is approximately 1.5 mm. The height of the helical ribs is approximately one third that of the radial fins 124 or approximately 2.5 mm.

Figure 6:
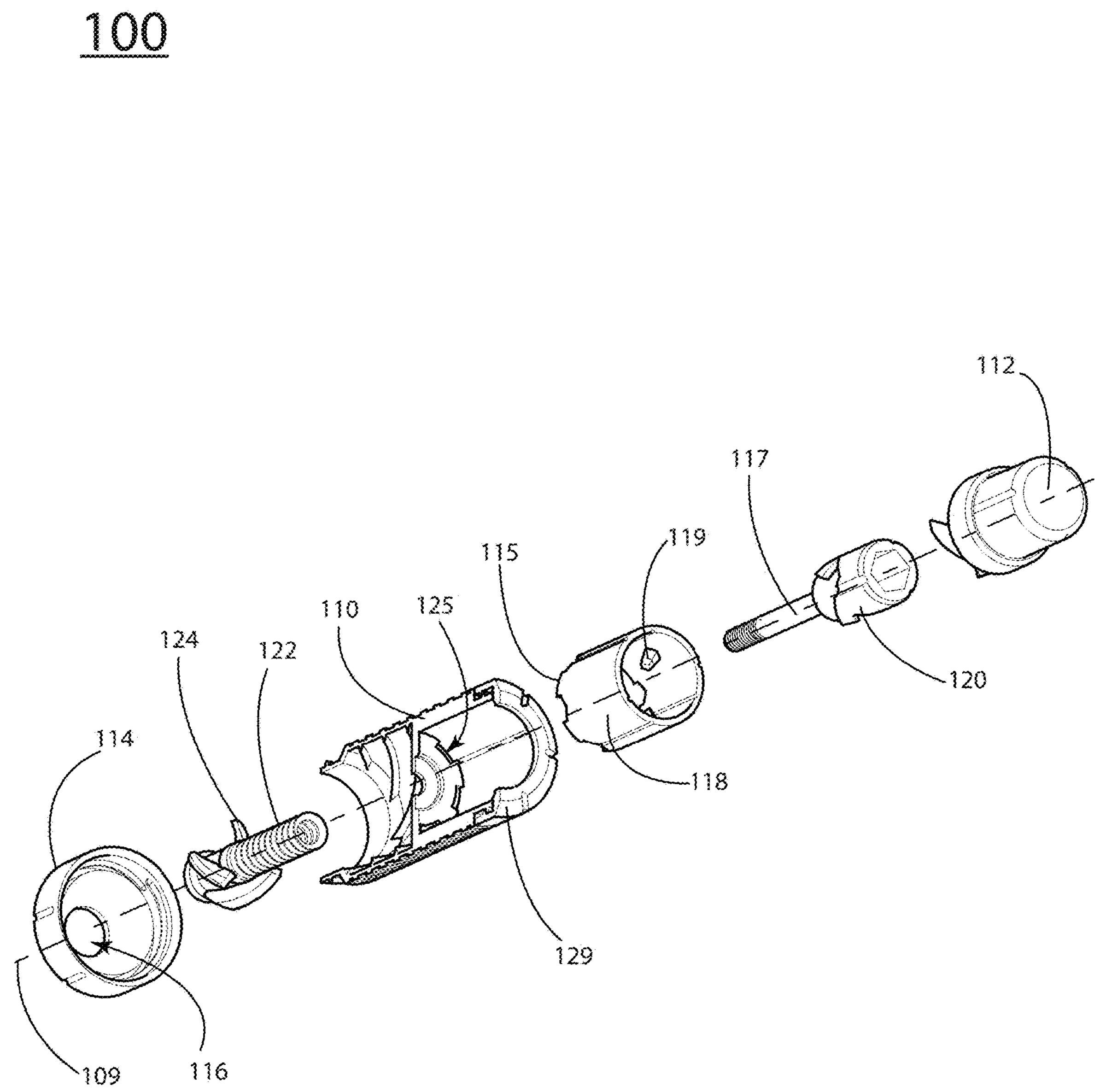
FIG. 6 is a perspective, exploded view thereof.

Referring to FIG. 4, FIG. 5 and FIG. 6, like reference numbers refer to like components. The collar 118 and button 112 are shown in section view in FIG. 4, to reveal cam teeth 119 in the collar 118 and to show ribs 142 on the interior of the button 112. The main body 110 is shown in section view in FIG. 6 to show the interior of the main body 110.

The shaft 117 (FIG. 4) has a head 120 and a first helical cam 113. The button 112 has a second helical cam 111 that rides against the cam teeth 119. The first helical cam is disposed on a helix that twists in the opposite direction of that of the second helical cam. The collar 118 fits into the main body 110, and annular teeth 115 mate with receptacles 125 (FIG. 6) in the interior of the main body 110 to prevent the collar 118 from rotating. An array of axial-alignment ribs 142 (FIG. 4) in the button mate with axial-alignment grooves 144 in the head 120 (FIG. 4 and FIG. 6). Alignment ribs 142 (FIG. 4) and alignment grooves 144 are parallel to the central axis 109. The alignment ribs 142 and alignment grooves 144 allow the head 120 to slide up and down in relation to the button 112 while rotating together, as the first helical cam 113 and second helical cam 111 slide along cam teeth 119.

Depressing the button 112 engages the second helical cam 111 with the cam teeth 119, forcing the button 112 to rotate. As the alignment ribs 142 and alignment grooves 144 align, the head 120 rotates with the button 112, and the first helical cam 113 on the head 120 slides up the cam teeth 119 to rotate and retract the shaft 117, which in turn retracts the plug 123 to open the aperture 116 for dispensing granular material. Rotating the button 112 repeatedly repeats the action to dispense a relatively larger quantity of granular material, permitting flow.

Rotating the button 112 causes radial fins 124 to mix and feed granular material from the container 140 (FIG. 5) through the aperture 116. Depressing the button dispenses a relatively small quantity of granular material 130 (FIG. 3). Rotating the button 112 completes the same internal movements of the shaft 117 (FIG. 6) and head 120 without depressing the button. In other words, rotating the button 112 engages alignment ribs 142 and alignment grooves 144 which causes the first helical cam 113 to rotate while lifting along cam teeth 119, thus lifting the plug and completing the 120° cycle, allowing the granular material to be continuously dispensed as the button is rotated.

The button 112 is held normally upward by the spring 136 to also hold the shaft 117 and therefore the plug 123 in a normally closed position. Depressing the button 112 engages second helical cam 111, first helical cam 113, and cam teeth 119 to rotate the fins 124 and to momentarily move the plug 123 out of the aperture 116 to dispense a relatively small quantity of granular material 130 (FIG. 3).

Figure 7:
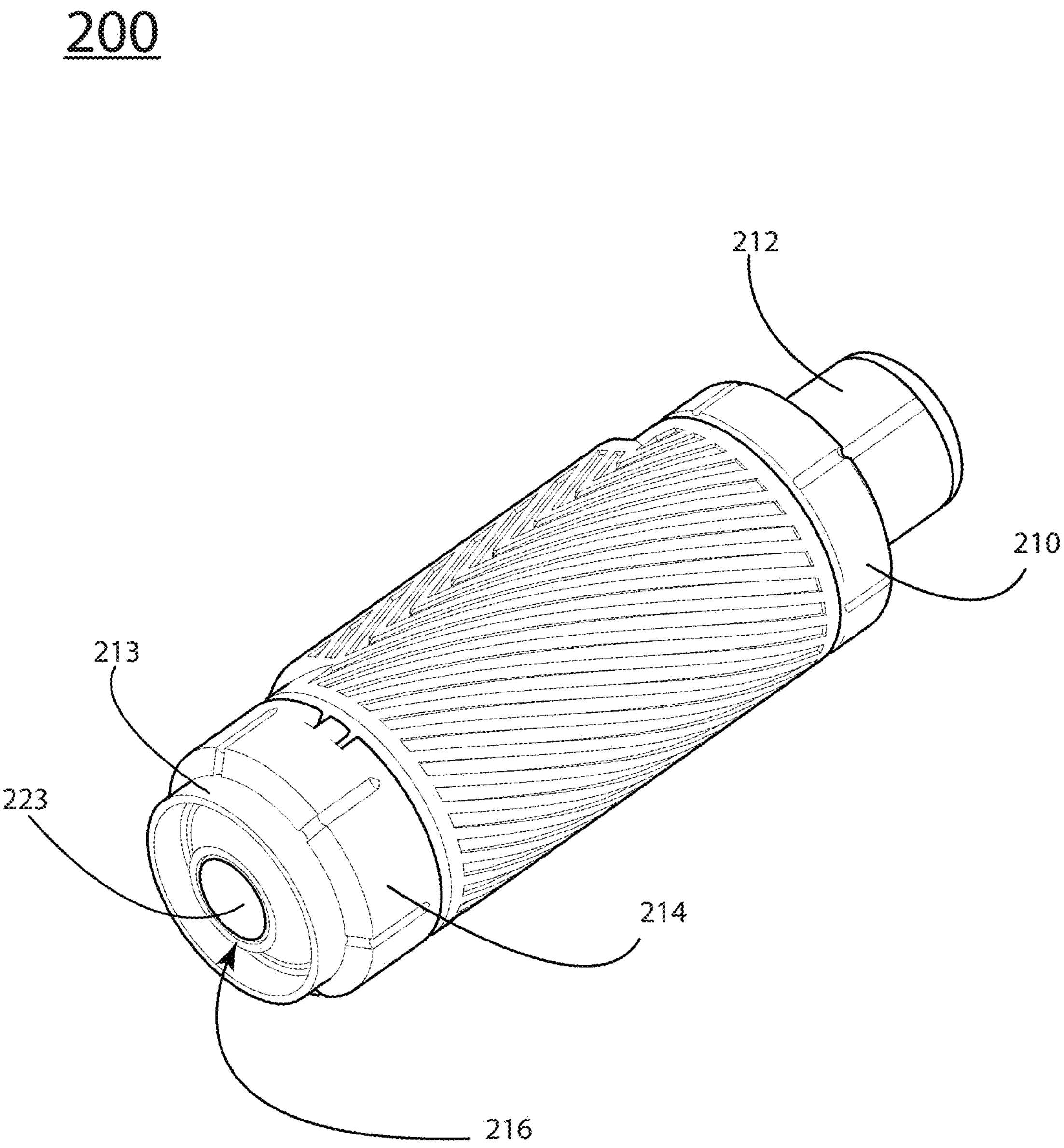
FIG. 7 is a perspective view of an iteration of the embodiment.
Figure 8:
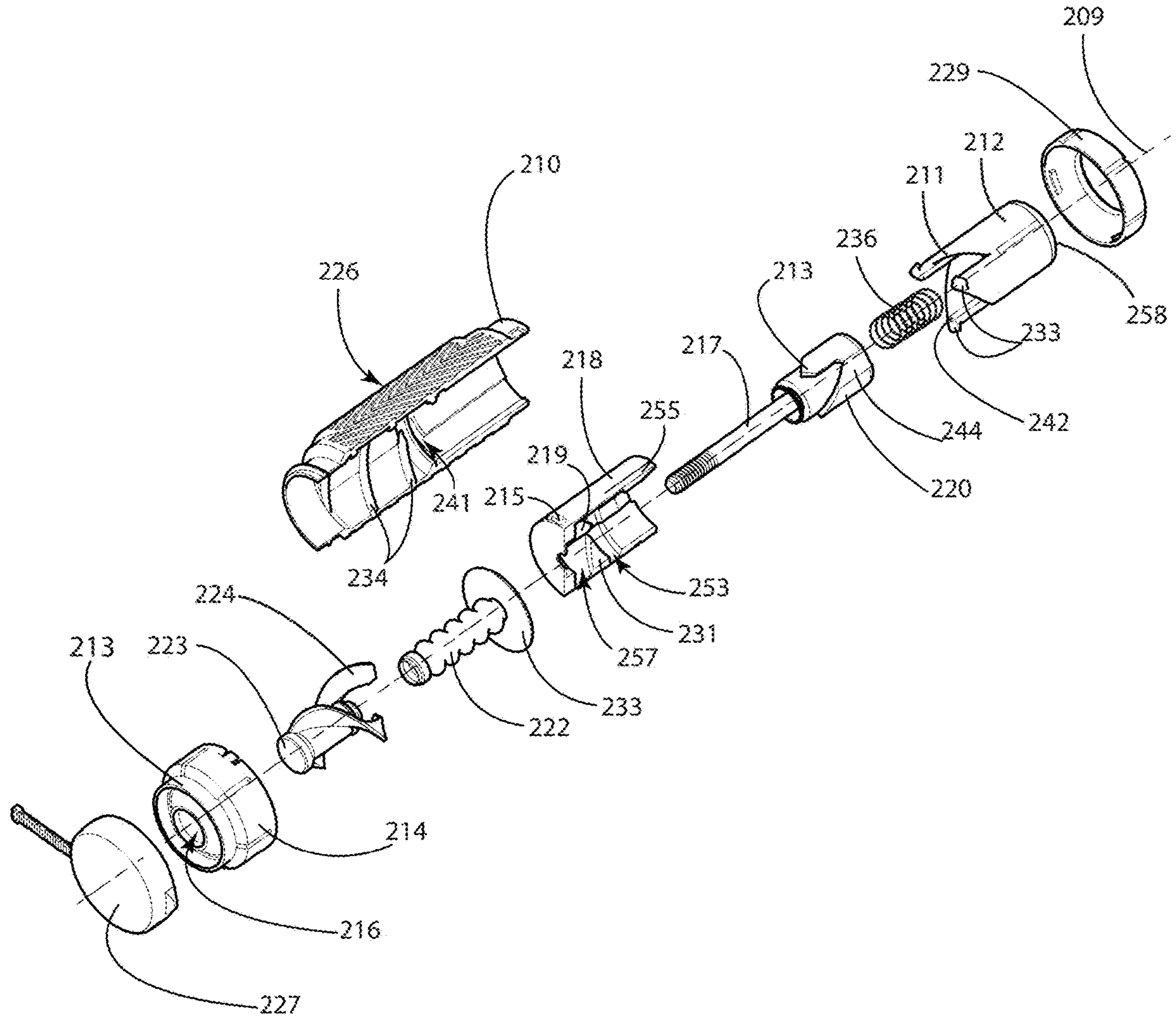
FIG. 8 is an exploded view thereof.
Figure 9:
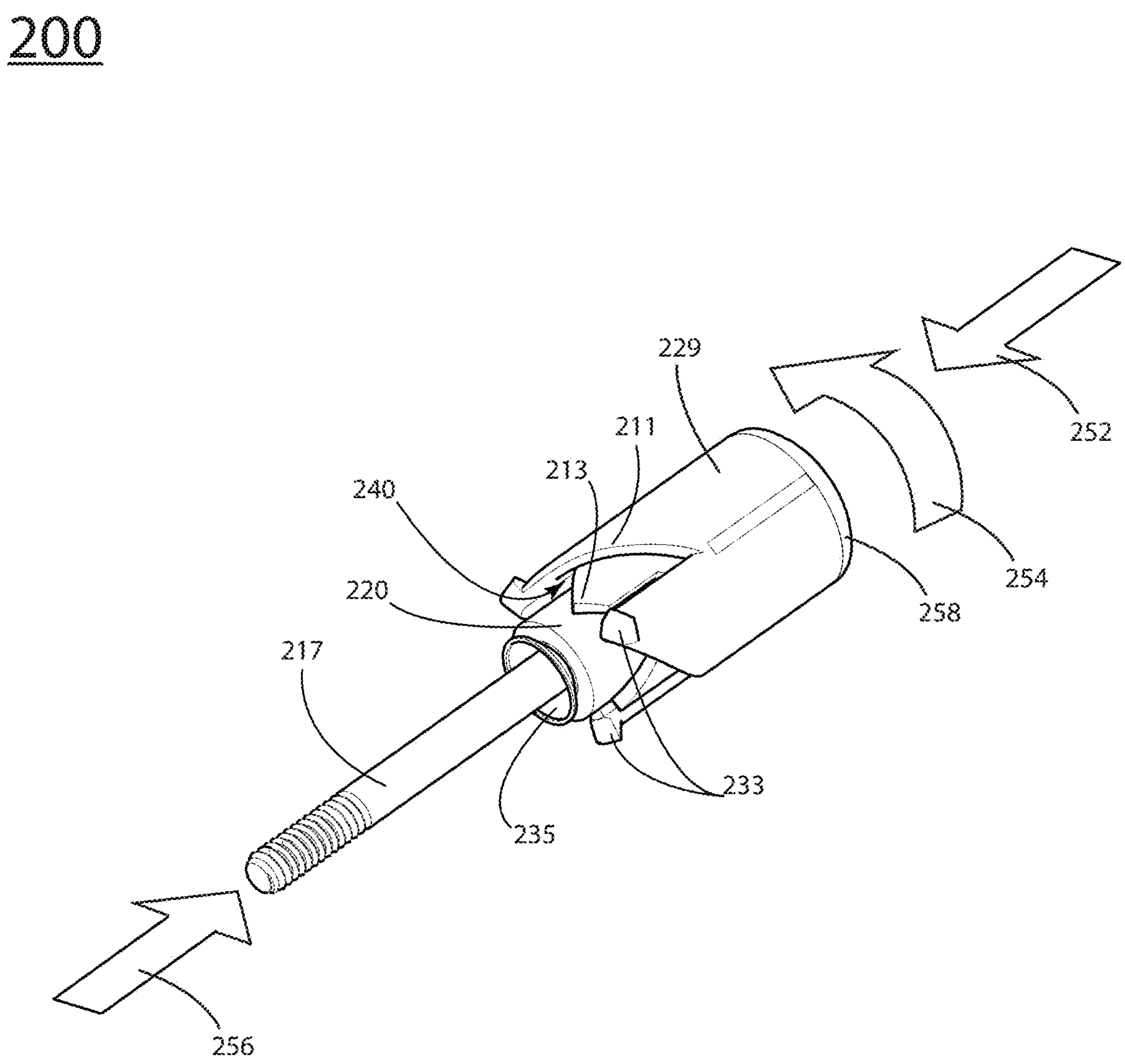
FIG. 9 is a partially exploded view thereof. x

FIG. 7, FIG. 8 and FIG. 9 show an iteration of the embodiment 200. This embodiment has a central container 210 that stores granular material. A cap 214 resides at a distal end of the apparatus and has an aperture 216 that is sealed by a plug 223 which is held in a normally closed position by a spring 236 (FIG. 8). A flange 213 on the cap 214 is configured to snap-fit to a flexible lid 227. The flexible lid 227 prevents the transfer of moisture or scent into or out of the container 210. The flange 213 is further configured to fit with ancillary attachments (not shown).

A button 212 at a proximal end and may be rotated or depressed. When the button is depressed, the mechanism dispenses a predetermined quantity of granular material. When the button 212 is rotated, the mechanism dispenses a relatively larger quantity of granular material in a stream that continues to be dispensed while the button is rotated.

The main body 210 has a distal cap 214 and a proximal collar 229. Ridges 226 provide a gripping surface on the exterior of the main body 210. The distal cap has an aperture 216 through which granular material is dispensed. The proximal collar 229 holds the button 212 in place against the spring 236, keeping the button 212 in a normally up position and the plug 223 in a normally closed position, in which the aperture 216 is blocked. The granular material is stored within the main body 210 until dispensed.

The plug 223 has radial fins 224 that mix and move material for dispensing when rotated. The radial fins are disposed in a helical pattern.

A ribbed cover 222 surrounds the shaft 217 and serves to mix the granular material as the shaft rotates about the central axis 209. The ribbed cover 222 attaches by friction fit to the shaft 217 proximal to the plug 223. A flange 233 seats against a flat surface on the collar 218. The flange 233 prevents moisture and scent from entering or exiting the storage container 210. An additional gasket 235 (FIG. 9) seals in the storage chamber 210 from the interior of the collar, further sealing moisture and scent within the storage area.

Granular material is sheared by helical ribs 234 (FIG. 8) which direct the material in a helical motion toward the fins 224 and through the opening 216 in the cap 214. In addition to directing the granular material toward the aperture, the helical ribs 234 add friction to hold the granular material in place. In some embodiments helical ribs 234 are disposed on the interior of the main body 210 on a helix that turns in the opposite direction of the helix of the radial fins 224. In other embodiments, the helical ribs 234 are on a helix that turns in the same direction as the helix of the radial fins 224. When the plug 223 is simultaneously retracted and turned (at about 120° per cycle), the helical ribs 234, together with the radial fins 224 shear the granular material as it falls down and out of the apparatus. Fins 224, the ribbed shaft 222, and the helical ribs 234 work together to mix and move granular material for dispensing.

The shaft 217 (FIG. 8) has a head 220 and a first helical cam 213. The button 212 has a second helical cam 211. The first helical cam 213 and second helical cam 211 are configured to interact with the cam teeth 219. The collar 218 fits into the main body 210 and teeth 215 mate with receptacles 241 in the interior of the main body 210 to prevent the collar 218 from rotating. One skilled in the art is familiar with similar mechanisms for fitting parts together. An array of axial-alignment ribs 242 in the button mate with axial-alignment grooves 244 in the head 220. Alignment ribs 242 and alignment grooves 244 are parallel to the central axis 209. The alignment ribs 242 and alignment grooves 244 allow the head 220 to slide up and down in relation to the button 212 while rotating together, as the first helical cam 213 and second helical cam 211 engage cam teeth 219.

Depressing the button 212 engages the second helical cam 211 with the cam teeth 219, forcing the button 212 to rotate. As the alignment fins 242 and alignment grooves 244 align, the head 220 rotates with the button 212 and first helical cam 213 on the head 220 slides up the cam teeth 219 to rotate and retract the shaft 217, which in turn retracts the plug 223 to open the aperture 216 for dispensing granular material. Repeatedly rotating the button 212 repeats the action to dispense a relatively larger quantity of granular material, permitting flow.

A form 231 in the collar 218 creates a first groove 257 and a second groove 253. Nodes 233 on the button 212 are configured to flex slotted portions 255 of the collar 218 and fit loosely within the second groove 253 to keep the cap in place within the collar 218 and therefore within the main body 210. Nodes 233 retain the button in the collar 218 and reset the mechanism after a cycle, so that the helical cam 211 is properly aligned with cam teeth 219 as the cycle completes.

Nodes 233 move along the first groove 257 when the button is depressed and move along the second groove 253 when the button is rotated. Nodes 233 further serve as a guide to reset the button 212 and hence the helical cam 211, to a "start" location in which the helical cams 211 are aligned with cam teeth 219. This alignment occurs as nodes 233 move along the first groove 257 until they rest in the second groove 253 as the spring 236 moves the button 212 upward to its normal position. One skilled in the art understands that without the form 231 and the first groove 257 and second groove 253, the spring 236 would move the button 212 upward without aligning the helical cam 211 with the cam teeth 219.

In some embodiments, the button 212 has a rotatable portion 258 that rests against a user's thumb while the button is depressed and rotates.

FIG. 9 illustrates a portion of the mechanism that controls the movement of the plug 223 and radial fins 224 (FIG. 8) to dispense granular material out of the orifice 216. The button 212 has a helical cam 211 that meets with cam teeth 219. The head 220 has a helical cam 213 that also meets with cam teeth 219 (FIG. 8). One skilled in the art will understand that when the button is depressed in a direction illustrated by arrow 252 (FIG. 9), the button 212 and head 220 will move toward the cam teeth. The button 212 and head 220 will then move such that the cam teeth will fit into the space shown by arrow 240. When the button and head interact in this way with the cam teeth, the cam 213 causes the head 220 and shaft 217 to rotate in the direction of arrow 254 while the head 220 and shaft 217 move in the direction of arrow 256. As cam teeth reach the apex of helical cam 213 the cam teeth 219 (FIG. 8) move over the apex to reset the head 220 and shaft 217 to their normal position.

The invention claimed is:

1. An apparatus for storing and dispensing granular material comprising:

a main body having an interior surface and an exterior surface configured to contain granular material; and a distal end having an aperture for dispensing granular material; and a button movably engaged with a proximal end of the main body; and a spring having a first end and a second end, the first end engaged with the button and the second end, engaged with a head which is in turn engaged with a first end of a shaft; and the head having a first helical cam movably engaged with cam teeth fixedly engaged with the main body interior surface; and said shaft engaged at a second end with a plug; and said plug movably engaged with the aperture for dispensing granular material;

wherein the spring holds the button in a normally upward position and the plug in a normally closed position against the distal cap, and depressing the button moves first helical cam against the cam teeth, thus moving the plug away from the aperture to dispense granular material.

2. The apparatus of claim 1 further comprising:

a distal cap fixedly engaged with the distal end of the main body surrounding the aperture for dispensing granular material.

3. The apparatus of claim 1 further comprising:

a proximal cap engaged with the proximal end of the main body surrounding the button.

4. The apparatus of claim 1 further comprising:

a second helical cam fixedly engaged with the button; and a collar having an interior and an exterior, the interior surrounding and movably engaged with the button; and the cam teeth engaged with the interior of the collar, and the exterior of the collar fixedly engaged with the main body, and the cam teeth movably engaged with the first helical cam and the second helical cam; and axial ridges engaged with said button movably engaged with axial grooves in said head; wherein axial ridges and grooves cause the button and head to rotate concentrically and the first helical cam and second helical cam cause the shaft head, shaft, plug and button to rotate while moving axially once, when the button is depressed, or repeatedly, when the button is rotated.

5. The apparatus of claim 1 wherein ridges on the exterior surface of the main body and are configured to assist in gripping the apparatus.

6. The apparatus of claim 1 further comprising:

a ribbed cover on the shaft; wherein ribs on the ribbed cover mix granular material as it is dispensed, and prevent granular material building up and clogging the mechanism and create a vapor barrier.

7. The apparatus of claim 4 further comprising:

a gasket on the shaft within the collar configured to create a vapor barrier.

8. The apparatus of claim 4 wherein the first helical cam is disposed on a counter-clockwise helix and the second helical cam is disposed on a clockwise helix; wherein movement of the first helical cam and the second helical cam against cam teeth causes rotation of both helical cams as well as the engaged components, while causing linear movement of the shaft head, shaft, and button.

9. The apparatus of claim 1 further comprising:

radial fins fixedly engaged with the shaft, proximal to the plug and aperture; wherein the radial fins mix and move granular material through the aperture.

10. The apparatus of claim 8 further comprising:

helical ribs engaged with the interior surface of the main body proximal to the radial fins on the plug; wherein helical ribs and radial fins in close proximity shear granular material to cut and mix the granular material while dispensing.

11. The apparatus of claim 9 wherein radial fins are helical and move proximal to helical ribs; wherein granular material is mixed between radial fins and helical ribs.

12. The apparatus of claim 10 wherein a gap exists between the radial fins and the helical ribs that is between 0.5 mm and 2.5 mm.

* * * * *